United States Patent
Lee et al.

(10) Patent No.: US 9,079,165 B2
(45) Date of Patent: Jul. 14, 2015

(54) ETHANOL REFORMING CATALYST COMPOSITION AND METHOD OF PRODUCING ETHANOL REFORMING CATALYST

(71) Applicant: NATIONAL CHIAO TUNG UNIVERSITY, Hsinchu (TW)

(72) Inventors: Chi-Shen Lee, Hsinchu County (TW); Sheng-Feng Weng, Taichung (TW); Yun-Sheng Chen, Taipei (TW); Yun-Hsin Wang, Kaohsiung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 13/873,160

(22) Filed: Apr. 29, 2013

(65) Prior Publication Data

US 2014/0213440 A1 Jul. 31, 2014

(30) Foreign Application Priority Data

Jan. 25, 2013 (TW) .............................. 102102902 A

(51) Int. Cl.

| B01J 23/00 | (2006.01) |
|---|---|
| B01J 23/02 | (2006.01) |
| B01J 23/10 | (2006.01) |
| B01J 23/40 | (2006.01) |
| B01J 23/42 | (2006.01) |
| B01J 23/70 | (2006.01) |

(Continued)

(52) U.S. Cl.
CPC *B01J 23/83* (2013.01); *B01J 23/63* (2013.01); *B01J 35/002* (2013.01); *B01J 37/0018* (2013.01); *B01J 37/036* (2013.01); *B01J 37/08* (2013.01); *B01J 37/10* (2013.01); *C01B 3/00* (2013.01)

(58) Field of Classification Search
CPC ............ B01J 21/00; B01J 23/00; B01J 23/10; B01J 23/462; B01J 23/63; B01J 23/70; B01J 23/72; B01J 23/75; B01J 23/755; B01J 23/83
USPC ................. 502/302–304, 326–327, 335, 337, 502/345–346, 349–351, 439
See application file for complete search history.

(56) References Cited

U.S. PATENT DOCUMENTS

| 3,816,348 A | * | 6/1974 | Popowich ................ 252/519.12 |
| 3,901,828 A | * | 8/1975 | Mai et al. ...................... 502/303 |

(Continued)

FOREIGN PATENT DOCUMENTS

| CN | 102513105 A | 6/2012 |
| EP | 1977823 A1 | 10/2008 |

(Continued)

*Primary Examiner* — Cam N. Nguyen
(74) *Attorney, Agent, or Firm* — Li & Cai Intellectual Property (USA) Office

(57) ABSTRACT

The instant disclosure relates to a preparation method of ethanol reforming catalyst, comprising the following steps. The first step is mixing a first metal precursor, a second metal precursor, and a third metal precursor with an organic medium to form a mixture. The next step is adding a surfactant to the mixture, and then allowing resting for 3 to 7 days to form a colloidal gel. The next step is calcining the colloidal gel for 1 to 5 hours in a first temperature region of 350° C. to 550° C., and then calcining the colloidal gel for 1 to 5 hours in a second temperature region of 800° C. to 1000° C. to form an ethanol reforming catalyst. The instant disclosure further provides an ethanol reforming catalyst composition.

3 Claims, 5 Drawing Sheets

(51) Int. Cl.
*B01J 23/72* (2006.01)
*B01J 21/04* (2006.01)
*B01J 23/83* (2006.01)
*B01J 37/03* (2006.01)
*B01J 37/08* (2006.01)
*B01J 37/10* (2006.01)
*B01J 23/63* (2006.01)
*B01J 35/00* (2006.01)
*B01J 37/00* (2006.01)
*C01B 3/00* (2006.01)

(56) References Cited

U.S. PATENT DOCUMENTS

| | | | | |
|---|---|---|---|---|
| 4,089,810 A | * | 5/1978 | Diwell et al. | 502/302 |
| 4,107,163 A | | 8/1978 | Donohue | 423/263 |
| 4,124,539 A | * | 11/1978 | Horowitz et al. | 252/519.13 |
| 4,134,852 A | * | 1/1979 | Volin | 502/302 |
| 4,146,458 A | * | 3/1979 | Horowitz et al. | 204/277 |
| 4,163,706 A | * | 8/1979 | Horowitz et al. | 204/242 |
| 4,176,094 A | * | 11/1979 | Horowitz et al. | 252/519.13 |
| 4,189,405 A | * | 2/1980 | Knapton et al. | 502/73 |
| 4,225,469 A | * | 9/1980 | Horowitz et al. | 252/519.13 |
| 4,377,840 A | * | 3/1983 | Nair | 361/320 |
| 4,420,422 A | * | 12/1983 | Ferretti | 252/519.13 |
| 4,921,829 A | * | 5/1990 | Ozawa et al. | 502/302 |
| 4,957,718 A | * | 9/1990 | Yoo et al. | 423/243.07 |
| 5,015,461 A | * | 5/1991 | Jacobson et al. | 423/594.8 |
| 5,105,053 A | * | 4/1992 | Jacobson et al. | 585/658 |
| 5,380,692 A | * | 1/1995 | Nakatsuji et al. | 502/303 |
| 5,472,924 A | * | 12/1995 | Afanasiev et al. | 502/308 |
| 5,622,680 A | * | 4/1997 | Monceaux et al. | 423/213.5 |
| 6,117,560 A | * | 9/2000 | Maloney | 428/472 |
| 6,231,991 B1 | * | 5/2001 | Maloney | 428/469 |
| 6,258,467 B1 | * | 7/2001 | Subramanian | 428/633 |
| 6,319,614 B1 | * | 11/2001 | Beele | 428/469 |
| 6,335,551 B2 | * | 1/2002 | Takemura | 257/306 |
| 6,387,526 B1 | * | 5/2002 | Beele | 428/469 |
| 6,387,539 B1 | * | 5/2002 | Subramanian | 428/633 |
| 6,495,878 B1 | * | 12/2002 | Hayashi et al. | 257/310 |
| 6,541,279 B2 | * | 4/2003 | Hayashi et al. | 438/3 |
| 6,558,831 B1 | * | 5/2003 | Doshi et al. | 429/495 |
| 6,596,054 B2 | * | 7/2003 | Flippo et al. | 95/54 |
| 6,835,465 B2 | * | 12/2004 | Allen et al. | 428/632 |
| 6,867,452 B2 | * | 3/2005 | Hayashi et al. | 257/310 |
| 7,205,257 B2 | * | 4/2007 | Tanaka et al. | 502/327 |
| 7,329,359 B2 | * | 2/2008 | Roark | 210/763 |
| 7,381,353 B2 | * | 6/2008 | Lee et al. | 252/511 |
| 7,572,751 B2 | * | 8/2009 | Isogai et al. | 502/302 |
| 7,641,875 B1 | * | 1/2010 | Golden | 423/213.5 |
| 8,158,550 B2 | * | 4/2012 | Cimino et al. | 502/302 |
| 8,609,575 B2 | * | 12/2013 | Talbot et al. | 502/300 |
| 2006/0202174 A1 | * | 9/2006 | Barker et al. | 252/519.33 |

FOREIGN PATENT DOCUMENTS

| | | |
|---|---|---|
| JP | 2003-265963 | 9/2003 |
| WO | WO 02/078840 | 10/2002 |

* cited by examiner

ETHANOL REFORMING CATALYST COMPOSITION AND METHOD OF PRODUCING ETHANOL REFORMING CATALYST

BACKGROUND OF THE INVENTION

1. Field of the Invention

The instant disclosure relates to a catalyst composition; in particular, to an ethanol reforming catalyst composition with high catalytic activity and a preparation method of the ethanol reforming catalyst.

2. Description of Related Art

Approximately 80% of the world's energy demand is dependent on fossil fuel (oil, coal and natural gas, etc) which have limited availability in nature. Sustained consumption of fossil fuel will eventually lead to severe deficiency of energy and cause serious environmental pollution in the meantime. As a result, the use of non-polluting and renewable energy alternatives to fossil fuels is an inevitable trend. Also, the selection and use of new energy source must comply with conditions such as cleanliness, high efficiency, very low pollution and renewability.

Hydrogen energy is a clean and sustainably consumable alternative energy with high energy conversion efficiency. Hydrogen is a prospective carrier of energy due to the energy content per unit mass (i.e., 120.7 kJ/g) which is larger than that of other fuels; it also burns cleanly without emitting pollutants to our environment. As a result, the popularity of hydrogen energy can significantly improve the energy shortage problem worldwide and reduce pollution to the environment. For example, the hydrogen fuel cell is a small size, high efficiency, and low pollution (main emission is water) device, which may achieve continuous operations with stable supply of fuels (hydrogen and oxygen). In recent years, advanced development of the hydrogen fuel cell technology has readily driven the demand for hydrogen. The chemical energy conversion efficiency of hydrogen can now be achieved up to 45~60% which is much higher than the heat engine efficiency (15%) of general internal combustion engine.

Scientists from multiple countries are hence devoted to investigate the appropriate hydrogen sources as a reproducible fuel due to the increased demand for hydrogen. Currently, methanol, ethanol, natural gas, naphtha and other hydrocarbons are mainly used as alternative hydrogen sources, of which ethanol possess the advantages of relatively high fuel quality, cheap price, convenience, ease of storage and transportation, and hydrogen generation at a relatively low reaction temperature of 200~400° C. Comparing hydrogen energy with traditional gasoline fuel, the generated carbon dioxide ($CO_2$) is reduced approximately 50%. Also, $NO_x$, $SO_x$, hydrocarbons, and other pollutants are eliminated.

Currently, there are four main reactions for hydrogen generation via ethanol as follow:

I. Ethanol Decomposition (ED)

Chemical reaction: $C_2H_5OH \rightarrow H_2 + CH_4 + CO$

II. Partial Oxidation of Ethanol (POE)

Chemical reaction: $C_2H_5OH + \frac{3}{2}O_2 \rightarrow 3H_2 + 2CO_2$

III. Steam Reforming of Ethanol (SRE)

Chemical reaction: $C_2H_5OH + 3H_2O \rightarrow 6H_2 + 2CO_2$

IV. Oxidative Steam Reforming of Ethanol (OSRE)

Chemical reaction: $C_2H_5OH + \frac{1}{2}O_2 + 2H_2O \rightarrow 2CO_2 + 5H_2$

Among the above reactions, reactions II, III, and IV are, in particular, the main focuses in academic researches. Steam reforming of ethanol is a reaction that applies high temperature heating and catalytic reaction to a water/ethanol mixture to produce hydrogen. Application of the oxidative steam reforming of ethanol provides another process to produce hydrogen under a lower temperature. The addition of oxygen affects the reforming process of ethanol to an exothermic reaction, and hence, the energetic exhaustion can be reduced. According to the chemical equations above, for each mole of ethanol, no more than 5 moles of hydrogen can be produced, thus, the maximum hydrogen selectivity is 167%. It is known in the prior technology that metals such as rhodium, ruthenium, platinum, palladium, iridium, and nickel can be used as catalysts to carry out catalytic reactions of ethanol while cerium oxides and zirconium oxides can be used as co-catalysts for the metal catalysts mentioned above.

In 2004, Schmidt group published a literature (G. A. Deluga, J. R. Salge, L. D. Schmidt, X. E. Verykios, Science, 2004, 303, 993-997.), in which high hydrogen selectivity are illustrated, based on the aforementioned reaction. In the literature, rhodium-cerium oxide is used as a catalyst, and 100% ethanol conversion and 116% hydrogen selectivity can be obtained. While the catalytic process is assisted by a second-stage catalyst, platinum-cerium oxide, the hydrogen selectivity can be further increased to 130%.

Currently, materials that can be applied to the oxidative steam reforming of ethanol for hydrogen production are quite limited besides cerium oxides. In 2009, Andrew T. Hsu and his team researched and developed a material having spinel structure, $NiAl_2O_4$—$FeAl_2O_4$ (refer to L. H. Huang, J. Xie, W. Chu, R. R. Chen, D. Chu, A. T. Hsu, Catal. Commun., 2009, 10, 502-508.), by which the hydrogen selectivity can achieve up to as high as 130% at 700° C. Although $NiAl_2O_4$—$FeAl_2O_4$ catalyst can provide excellent reactivity, the applicable temperature range is too high and therefore becomes an economically unsound solution in the long run.

Furthermore, international publication no. $O_2$/078840 reveals a modified catalyst which is formed by a manganese oxide support having at least one metal selected from the group consisting of rhodium, ruthenium, platinum, palladium, iridium and nickel. Japanese publication no. 2003-265963 discloses a catalyst including a support having manganese oxide that has at least one metal selected from the group consisting of rhodium, ruthenium, platinum, palladium, iridium and nickel. The publications firstly apply at least one chlorine-containing compound, decompose with an alkaline aqueous solution, and then rinse the modified catalyst with water to remove chloride atoms.

Although the modified catalysts mentioned as above possess high reactivity, in terms of strength, and durability, improvements are still needed; production cost is relatively high, which is not suitable for commercial applications. Moreover, during steam reforming reaction of ethanol, the catalysts prepared by traditional impregnation preparation method, coke is readily produced which reduces the usable life of the catalysts.

To address the above issues, the inventor strives via associated experience and research to present the instant disclosure, which can effectively improve the limitation described above.

SUMMARY OF THE INVENTION

The object of the instant disclosure is to resolve the problem of the aggregation of metal ions that leads to active decay and the broken bond between carbon-carbon which leads to the formation of coke through solid solution method.

In order to achieve the aforementioned objects, according to an embodiment of the instant disclosure, a preparation method for an ethanol reforming catalyst comprising the steps as follow: Firstly, mix a first metal precursor, a second metal precursor, and a third metal precursor with an organic medium to form a mixture. Next, add a surfactant into the mixture and allow resting for 3 to 7 days at 30° C. to 50° C. to form a colloidal gel. Then, calcine the colloidal gel for 1 to 5 hours in a first temperature region of 350° C. to 550° C. and calcine the colloidal gel for 1 to 5 hours in a second temperature region of 800° C. to 1000° C. to form the ethanol reforming catalyst.

According to the aforementioned preparation method, the instant disclosure provides an ethanol reforming catalyst composition comprising a catalyst support and a metal oxide solid solution supported on a surface of the support including a ruthenium metal, a first metal and a second metal. The first metal is an element selected from the group consisting of titanium, zirconium, and cerium. The second metal is an element selected from the group consisting of scandium, yttrium, and lanthanum.

According to the aforementioned preparation method, the instant disclosure provides another ethanol reforming catalyst composition comprising a catalyst support and a metal oxide solid solution supported on a surface of the support including a lanthanum metal, a first metal and a second metal. The first metal is selected from the group consisting of zirconium and cerium. The second metal is selected from the group consisting of cobalt, nickel, and copper.

In summary, the method of producing ethanol reforming catalyst by preparing solid solution can increase the dispersion of metal ions (such as ruthenium and nickel ions) which can be stable at an ionic state in the material structure. In addition, reactivity of the catalysts can be enhanced and the formation of readily vaporized metal oxides (such as ruthenium dioxide) that are generated under high temperature during prolonged catalyzing can be prevented.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

An ethanol reforming catalyst in accordance with the embodiment according to the instant disclosure is provided. The ethanol reforming catalyst increases the dispersion of metal ions within the structure through the preparation of solid solutions in order to enhance the usable life and stability of the catalyst and minimize the generation of coke while generating hydrogen during the reaction.

First Embodiment

Figure 1:
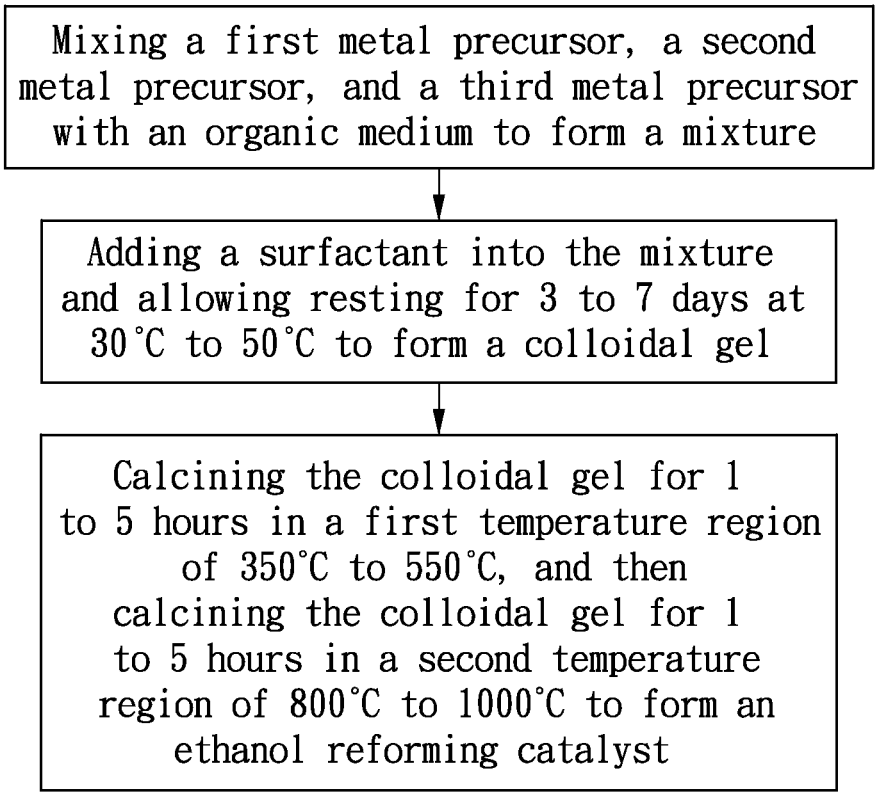
FIG. 1 is a flow chart illustrating a preparation method for ethanol reforming catalysts according to the instant disclosure.

Please refer to FIG. 1 as the process diagram of the steps for preparing the ethanol reforming catalyst according to the instant disclosure. Specific content of each step is described as the following.

Synthesis

Step 1: Mixing a first metal precursor, a second metal precursor, and a third metal precursor into an organic medium to form a mixture. Specifically, the first metal precursor, the second metal precursor and the third metal precursor may respectively be a metal salt, metal hydrate, or metal chloride. In addition, the organic medium can be selected from methanol ($CH_3OH$), ethanol ($C_2H_5OH$), butanol ($C_4H_9OH$), or isopropanol ($(CH_3)_2CHOH$).

Furthermore, the first metal precursor can be selected from $TiCl_4$, $ZrO(NO_3)_2 \cdot 2H_2O$ or $Ce(NO_3)_3 \cdot 6H_2O$. In other words, the first metal can be one of the following metals: titanium, zirconium, or cerium. The second metal precursor can be $Sc(NO_3)_3 \cdot 4H_2O$, $Y(NO_3)_3 \cdot 6H_2O$ or, $La(NO_3)_3 \cdot 6H_2O$. In other words, the second metal can be one of the following metals: scandium, yttrium, or lanthanum. The third metal precursor can be $RuCl_3 \cdot 3H_2O$, which also means the third metal can be ruthenium metals, and the organic medium can be ethanol.

In the instant embodiment, cerium nitrate, lanthanum nitrate and ruthenium chloride are weighed with different masses, then dissolved in room temperature, and homogeneously mixed into 5 g of ethanol to form a mixture which has a total metal ion concentration of 5 mmol. In a different embodiment, the first metal precursor can also be titanium tetrachloride or zirconyl nitrate. The second metal precursor can also be scandium nitrate or yttrium nitrate which is weighed with different masses and dissolved in room temperature; notably, the mixture has a total metal ion concentration of 5 mmol.

Step 2: Adding a surfactant into the mixture, allowing resting for 3 to 7 days at 30° C. to 50° C. to form a colloidal gel. Specifically, the surfactant can be P123 as illustrated in the following chemical formula:

After thoroughly mixing P123 with the mixture mentioned above, the mixture is preferably allowed resting for 3 days at 40° C. Notably, the surfactant of the instant disclosure is not limited to P123, and may be selected from one of the following: F68, F108, and F127.

Step 3: Calcine the colloidal gel for 1 to 5 hours in a first temperature region of 350° C. to 550° C., and then calcine the colloidal gel for 1 to 5 hours in a second temperature region of 800° C. to 1000° C. to form an ethanol reforming catalyst. Specifically, the colloidal gel formed from step 2 is inserted into a high temperature furnace and calcine at 450° C. for 5 hours. Thereafter, the colloidal gel is calcined at 900° C. for 5 hours to form crystalline phase. As a result, the ethanol reforming catalysts in accordance with the instant disclosure are obtained. According to the steps of the instant embodiment, the resulting ethanol reforming catalyst (metal oxide solid solution) is listed in the following chemical formula:

$$A_2(B_{2-x}Ru_x)O_7 \qquad \text{Formula 1}$$

where x is $0 \leq x \leq 0.4$.

A is an element selected from the group consisting of scandium, yttrium, and lanthanum.

B is an element selected from the group consisting of titanium, zirconium and cerium.

Furthermore, the ethanol reforming catalyst (metal oxide solid solution) in the instant embodiment can be formed on a surface of a catalyst support to constitute an ethanol reforming catalyst composition, in which the catalyst support can be selected from metal oxides having a relatively large surface area such as silica or alumina but is not limited thereto.

Example

Figure 2:
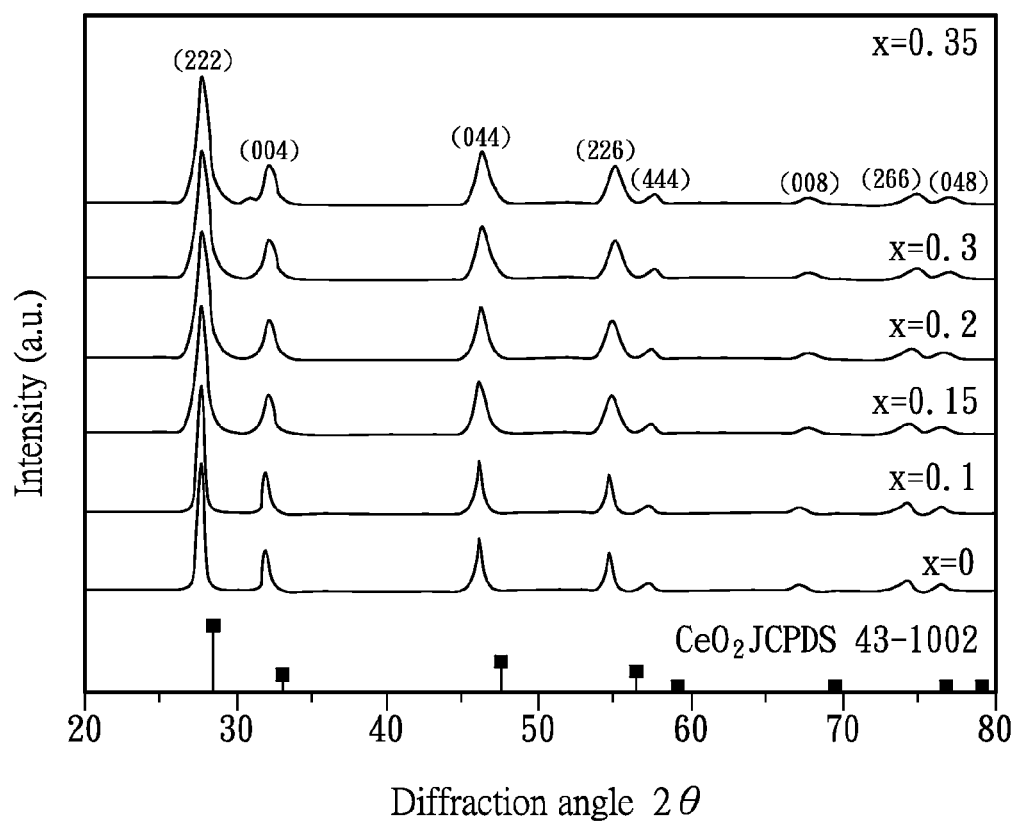
FIG. 2 is an X-ray diffraction pattern for the ethanol reforming catalysts according to a first embodiment of the instant disclosure.
Figure 3:
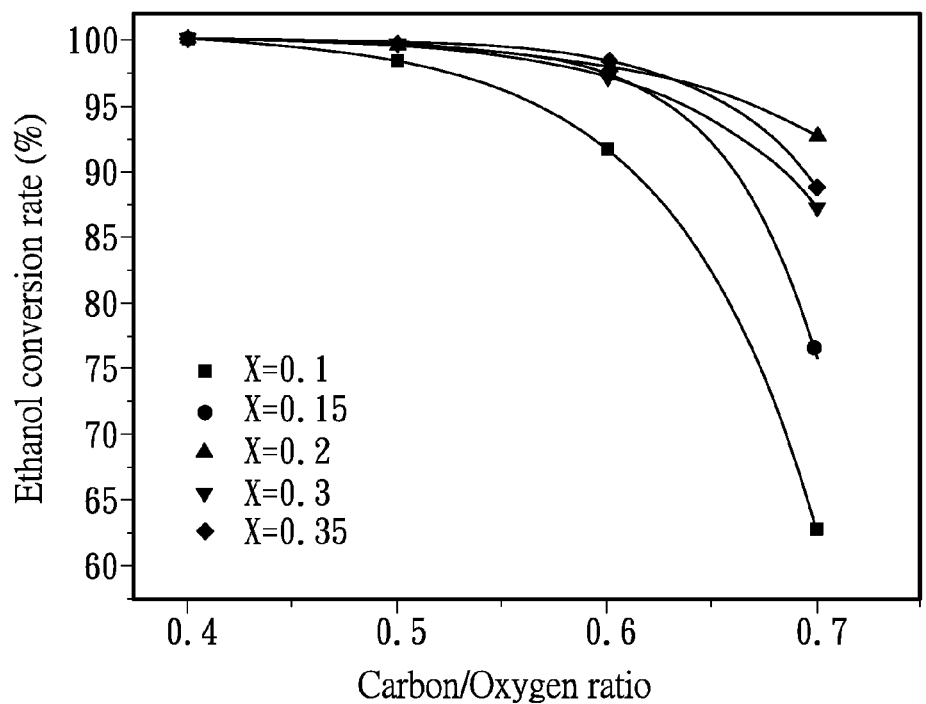
FIG. 3 is a graph illustrating the relationship between the carbon/oxygen ratio and the ethanol conversion rate for the ethanol reforming catalysts according to the first embodiment of the instant disclosure.
Figure 4:
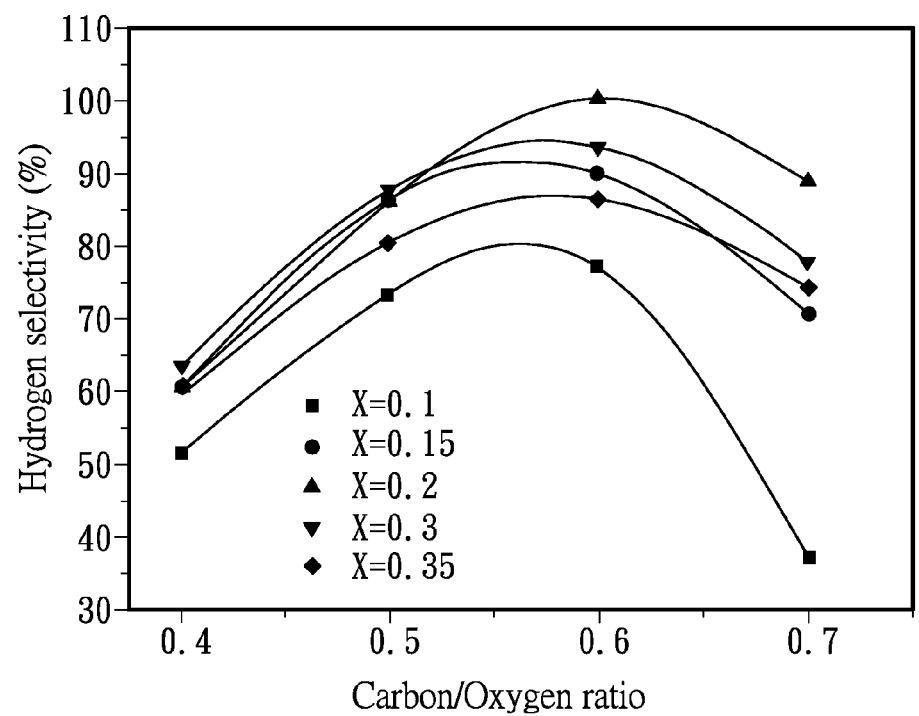
FIG. 4 is a graph illustrating the relationship between the carbon/oxygen ratio and the hydrogen selectivity for the ethanol reforming catalysts according to the first embodiment of the instant disclosure.

Please refer to FIGS. 2 to 4. FIG. 2 illustrates the X-ray diffraction pattern for the ethanol reforming catalysts according to a first embodiment of the instant disclosure while FIGS. 3 and 4 are graphs comparing the carbon/oxygen ratio respectively with the ethanol conversion rate and the hydrogen selectivity for the ethanol reforming catalysts. As illustrated in FIG. 2, the preparation method for ethanol reforming catalysts of the instant embodiment can provide catalyst materials with relatively high purity. As illustrated in FIG. 3, at a carbon/oxygen ratio below 0.7, the ethanol reforming catalyst can provide ethanol conversion rate of 100%. As illustrated in FIG. 4, the hydrogen generation rate has the most preferable hydrogen selectivity of 100 (2) % under the conditions that the mole ratio between lanthanum, cerium, and ruthenium is respectively 1:0.9:0.1 and the reaction temperature is at 400° C.

Second Embodiment

Please refer to FIG. 1. The instant embodiment can effectively reduce the formation of coke during the extended period of catalytic reaction. The reduction of coke is achieved by the dispersion of nickel ions within the solid solution structure. Varying from the first embodiment, the first metal precursor of the instant embodiment can be selected from $ZrO(NO_3)_2 \cdot 2H_2O$ or $Ce(NO_3)_3 \cdot 6H_2O$ which means the first metal can be one of the following metals: zirconium or cerium. The second metal precursor can be selected from $Cu(NO_3)_2 \cdot 2H_2O$, $Co(NO_3)_2 \cdot 6H_2O$ or $Ni(NO_3)_2 \cdot 6H_2O$ which means the second metal can be one of the following metals: copper, cobalt, or nickel. The third metal precursor can be $La(NO_3)_3 \cdot 6H_2O$ which means the third metal can be lanthanum.

Specifically, the first, second, and third metal precursor are respectively lanthanum nitrate, cerium nitrate and nickel nitrate. Similarly, lanthanum nitrate, cerium nitrate and nickel nitrate are weighed at various mass, then dissolved at room temperature, and homogeneously mixed into 5 g of ethanol to form a mixture which has a total metal ion concentration of 5 mmol. Please refer to the first embodiment for further details for steps 2 and 3 as step 2 and 3 of the instant embodiment is the same as the first embodiment. The ethanol reforming catalyst (metal oxide solid solution) prepared via the steps according to the instant disclosure has a chemical formula listed below:

$$La_2(C_{2-x}D_{0.5x})O_{7-1.5x} \qquad \text{Formula 2}$$

where x is $0 \leq x \leq 0.9$.

C is an element selected from the group consisting of zirconium and cerium.

D is an element selected from the group consisting of cobalt, nickel, and copper.

Furthermore, the ethanol reforming catalyst (metal oxide solid solution) according to the instant disclosure can be formed on a surface of a catalyst support to constitute an ethanol reforming catalyst composition, in which the catalyst support can be selected from metal oxides having a relatively large surface area such as silica or alumina but is not limited thereto.

Example

Figure 5:
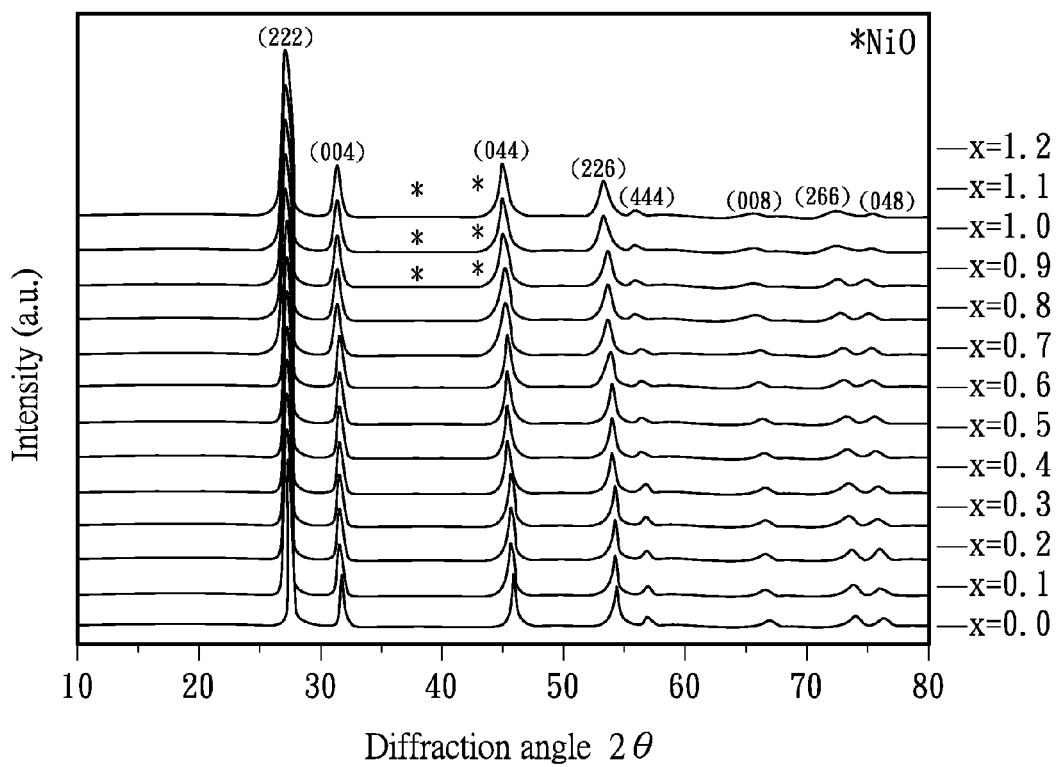
FIG. 5 is an X-ray diffraction pattern for the ethanol reforming catalysts according to a second embodiment of the instant disclosure.
Figure 6:
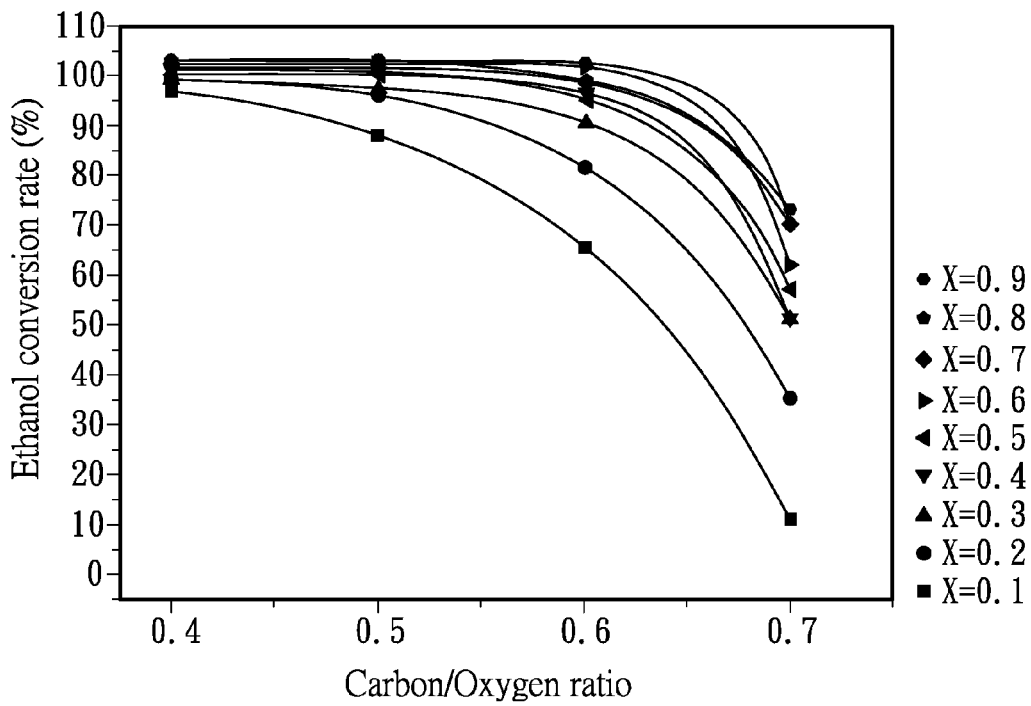
FIG. 6 is a graph illustrating the relationship between the carbon/oxygen ratio and the ethanol conversion rate for the ethanol reforming catalysts according to the second embodiment of the instant disclosure.
Figure 7:
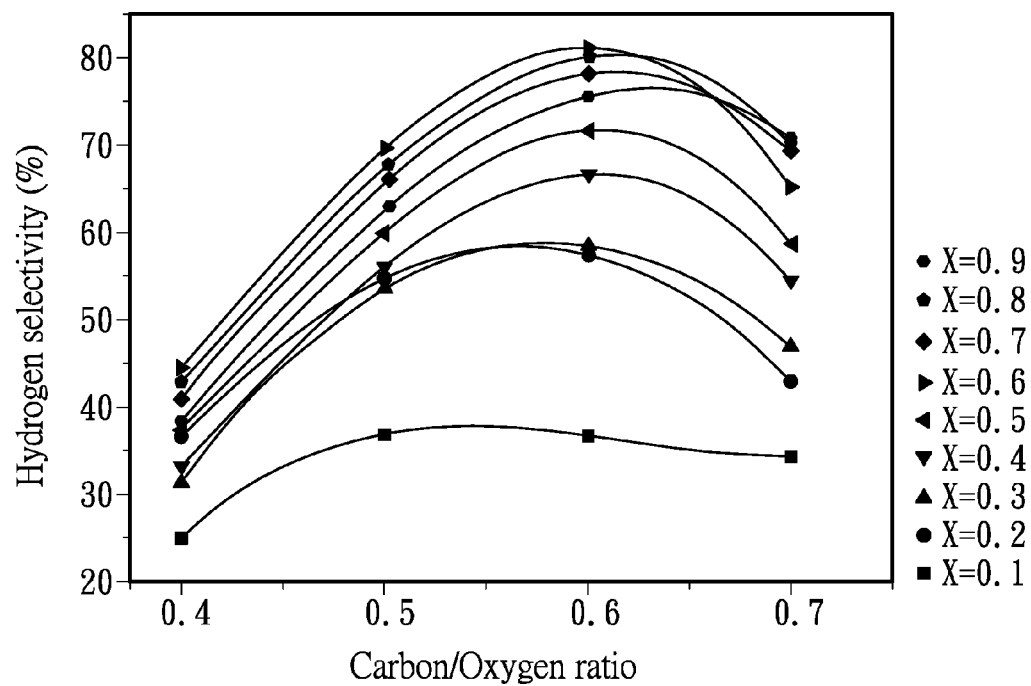
FIG. 7 is a graph illustrating the relationship between the carbon/oxygen ratio and the hydrogen selectivity for the ethanol reforming catalysts according to the second embodiment of the instant disclosure.

Please refer to FIGS. 5 to 7 in which FIG. 5 illustrates an X-ray diffraction pattern for the ethanol reforming catalysts according to a second embodiment of the instant disclosure while FIGS. 6 and 7 respectively show graphs comparing the carbon/oxygen ratio with the ethanol conversion rate and the hydrogen selectivity for the ethanol reforming catalysts. As illustrated in FIG. 4, the preparation method for ethanol reforming catalysts of the instant embodiment can provide catalyst materials with relatively high purity, in which the pure phase, x, is $0 \leq x \leq 0.9$. As illustrated in FIG. 6, at a carbon/oxygen ratio below 0.7 where $x \geq 0.7$, the ethanol reforming catalyst can provide ethanol conversion rate of 100%. As illustrated in FIG. 7, the hydrogen generation rate has the most preferable hydrogen selectivity of 80(2) % under the conditions that the mole ratio between lanthanum, cerium, and nickel is respectively 2:1.1:0.45 and the reaction temperature is at 500° C.

Potential Effect of the Embodiments

In summary, the method of producing ethanol reforming catalyst by preparing solid solution can increase the dispersion of metal ions (such as ruthenium and nickel ions) which can be stable at an ionic state in the material structure. In addition, reactivity of the catalysts can be enhanced and the formation of readily vaporized metal oxides (such as ruthenium dioxide) that are generated by high temperature during prolonged catalyzing can be prevented.

With enhancement in catalyst reactivity, consumption of precious metals such as ruthenium can be reduced to provide materials cost savings. In addition, although the instant disclosure uses active metals such as nickel to prepare the catalyst, carbon deposition caused by the poor dispersion of nickel during the prolonged catalytic reaction can be effectively reduced because of the excellent dispersion of nickel ions within the solid solution structure.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. An ethanol reforming catalyst composition, comprising: an ethanol reforming catalyst listed in the following general formula (I):

$$A_2(B_{2-x}Ru_x)O_7,$$

wherein the ethanol reforming catalyst is used for steam reforming reaction of ethanol, so as to catalyze generation of hydrogen during the steam reforming reaction of ethanol, wherein x is $0 \leq x \leq 0.4$;

A is selected from the group consisting of scandium, yttrium, and lanthanum; and B is selected from the group consisting of titanium, zirconium, and cerium.

2. The ethanol reforming catalyst composition as recited in claim 1, wherein the x is 0.

3. An ethanol reforming catalyst composition, comprising: a general formula (II):

$$La_2(C_{2-x}D_{0.5x})O_{7-1.5x} \qquad \text{Formula (II)}$$

wherein x is $0 \leq x \leq 0.9$;

C is selected from the group consisting of zirconium and cerium; and

D is selected from the group consisting of cobalt, nickel, and copper.

* * * * *